(12) United States Patent
Jaeger et al.

(10) Patent No.: US 12,146,473 B2
(45) Date of Patent: Nov. 19, 2024

(54) PROPULSION DEVICE

(71) Applicant: PNETICS, LLC, Las Vegas, NV (US)

(72) Inventors: Robert H Jaeger, Reno, NV (US);
Richard L Hicksted, Reno, NV (US)

(*) Notice: Subject to any disclaimer, the term of this patent is extended or adjusted under 35 U.S.C. 154(b) by 0 days.

(21) Appl. No.: 17/675,489

(22) Filed: Feb. 18, 2022

(65) Prior Publication Data

US 2023/0265837 A1 Aug. 24, 2023

(51) Int. Cl.
*F03G 3/00* (2006.01)

(52) U.S. Cl.
CPC .................................. *F03G 3/087* (2021.08)

(58) Field of Classification Search
CPC . F03G 3/00; F03G 3/087; F03G 3/097; F03G 7/10; F03G 7/107; F03G 7/125; F03G 7/135; F03G 3/091
See application file for complete search history.

(56) References Cited

U.S. PATENT DOCUMENTS

| | | | | |
|---|---|---|---|---|
| 3,584,515 A * | 6/1971 | Matyas | ..................... | F03G 3/00 74/84 S |
| 3,653,269 A * | 4/1972 | Foster | ..................... | F03G 7/10 74/84 S |
| 3,756,086 A * | 9/1973 | McAlister | ............... | F03G 7/125 74/84 R |
| 3,998,107 A * | 12/1976 | Cuff | ......................... | F16H 21/34 74/84 S |
| 4,579,011 A * | 4/1986 | Dobos | ....................... | F03G 3/00 74/61 |
| 4,712,439 A * | 12/1987 | North | ........................ | F03G 3/00 74/61 |
| 8,066,226 B2 * | 11/2011 | Fiala | ...................... | B64G 1/285 244/165 |
| 8,434,379 B2 * | 5/2013 | Romano | ................... | F03G 3/00 74/84 S |
| 2004/0178009 A1 * | 9/2004 | Pavlykivskyj | .......... | B60L 50/30 180/65.1 |
| 2004/0178634 A1 * | 9/2004 | Eskandr | .................. | F03G 1/029 290/1 R |
| 2009/0183951 A1 * | 7/2009 | Fiala | ...................... | F03G 7/135 185/27 |
| 2021/0276737 A1 * | 9/2021 | Opalek | ................... | F03G 7/125 |

FOREIGN PATENT DOCUMENTS

KR       830009375 A * 12/1983
WO   WO-2016049491 A1 * 3/2016 ............... F03G 3/00

* cited by examiner

*Primary Examiner* — Phillip A Johnson

(57) ABSTRACT

A propulsion device is provided that utilizes a propulsion system that does not require expulsion of mass from the object being propelled or from the propulsion device itself. The present invention utilizes rotating disks (having a relatively large mass) interacting with freely rotating point masses (having relatively little mass; in a preferred embodiment, a point mass has a mass equal to approximately 0.018% of the mass of a rotating disk), to produce relatively large amounts of centripetal acceleration from zero to $\pi$ radians of rotation, or less, without a corresponding acceleration from $\pi$ to $2\pi$ radians, and thereby produce relatively large amounts of positive thrust that may be applied to an object to produce propulsion of that object.

19 Claims, 4 Drawing Sheets

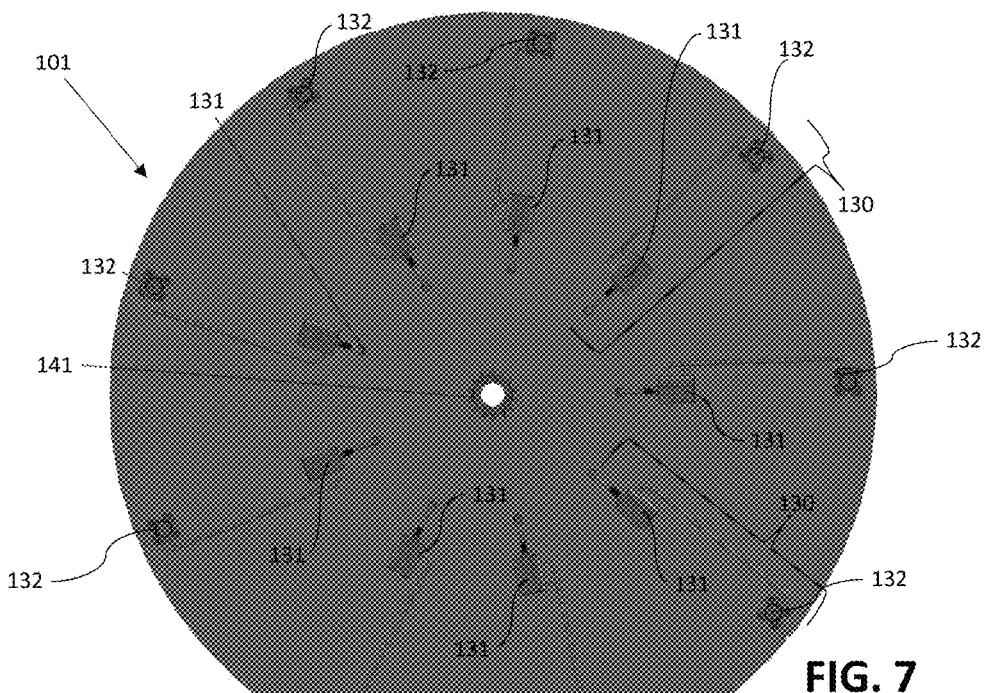
FIG. 7
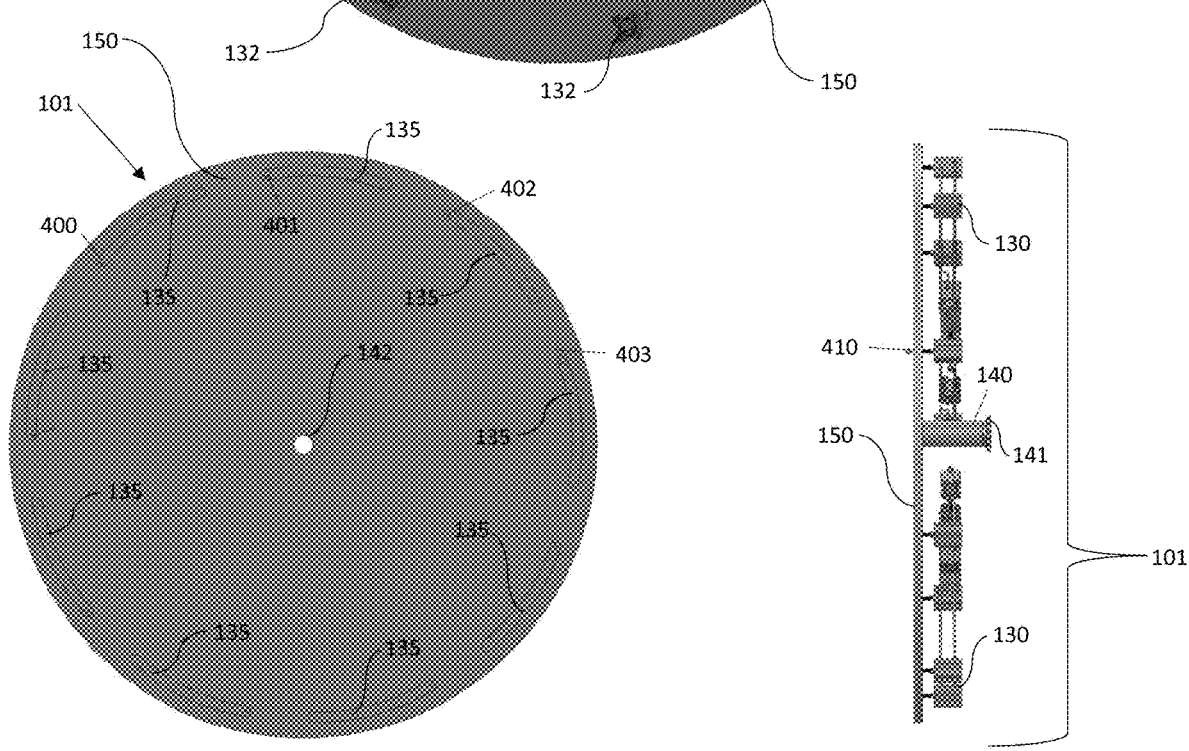
FIG. 8
FIG. 9

PROPULSION DEVICE

SUMMARY OF THE INVENTION

The present invention is generally related to propulsion devices intended to drive an object forward (or upward, as desired), and more particularly related to devices utilizing one or more disks having a relatively large mass rotating on a shaft and interacting with one or more independently rotating point masses having relatively little mass to transform input force into improved efficiency propulsion.

The herein disclosed propulsion device is intended to be an improvement over well-known propulsion devices by utilizing a differing propulsion system that does not require expulsion of mass from the object being propelled or from the propulsion device itself. Instead, the present invention utilizes rotating disks (having a relatively large mass) interacting with freely rotating point masses (having relatively little mass; in a preferred embodiment, a point mass has a mass equal to approximately 0.018% of the mass of a rotating disk), to produce relatively large amounts of centripetal acceleration from zero to $\pi$ radians of rotation, or less, without a corresponding acceleration from $\pi$ to $2\pi$ radians, and thereby produce relatively large amounts of positive thrust that may be applied to an object to produce propulsion of that object.

In its broadest conception, the present invention may include a disk module for rotating on a shaft, wherein the disk module includes a first disk assembly having at least one piston assembly, a fixed plate, and a second disk assembly having at least one piston assembly; a first stationary cam assembly rigidly attached to a device frame and having a first cam for physically initiating the piston assembl(ies) of the first disk assembly; a second stationary cam assembly rigidly attached to the device frame and having a second cam for physically initiating the piston assembl(ies) of the second disk assembly; and a point mass having a relatively small mass for receiving force from the piston assemblies of the first desk assembly to move the point mass through the fixed plate and into one or more cut pathways formed by the second disk assembly, wherein the point mass travels—via force imparted by the centripetal acceleration of the point mass around the shaft—through the one or more cut pathways formed by the second disk assembly to a piston assembly at which the piston assembly activates a pushrod to protrude and thus move the point mass through the fixed plate again and back to the first disk assembly, wherein the point mass will again travel via force imparted by the centripetal acceleration of the point mass around the shaft. Thus, the point mass travels in partial rotations around the shaft and within a cut pathway formed by the first disk assembly, is then pushed by a piston assembly through the fixed plate and into a cut formed by the second disk assembly. At which point the point mass repeats the process to travel through a cut pathway via centripetal acceleration to another piston assembly. In this way, one or more point masses may be moved back and forth between the first disk assembly and the second disk assembly.

In a preferred embodiment, the herein disclosed propulsion device includes a plurality of disk modules to increase the propulsion output and to take advantage of the balance provided by counter-rotating disks positioned along a shared shaft. Preferably, the propulsion device may include two disk modules, each having two disk assemblies, and may utilize up to nine piston assemblies on each disk assembly and a plurality of point masses traveling back and forth between disk assemblies to provide increased propulsion.

For example, a propulsion device may include: a first disk module for rotating on a shaft, wherein the first disk module includes a first disk assembly supported on a shaft and having at least one piston assembly, a first fixed plate, and a second disk assembly supported on the shaft and having at least one piston assembly, and wherein the first disk assembly is positioned opposite from the second disk assembly; a second disk module for rotating on a shaft, wherein the second disk module includes a third disk assembly supported on a shaft and having at least one piston assembly, a second fixed plate, and a fourth disk assembly supported on the shaft and having at least one piston assembly, and wherein the third disk assembly is positioned opposite from the fourth disk assembly; a first stationary cam assembly rigidly attached to a device frame, wherein the first stationary cam assembly includes a first cam for physically initiating the at least one piston assembly on the first disk assembly; a second stationary cam assembly rigidly attached to the device frame, wherein the second stationary cam assembly includes a second cam for physically initiating the at least one piston assembly on the second disk assembly; a third stationary cam assembly rigidly attached to the device frame, wherein the third stationary cam assembly includes a third cam for physically initiating the at least one piston assembly on the third disk assembly; a fourth stationary cam assembly rigidly attached to the device frame, wherein the fourth stationary cam assembly includes a fourth cam for physically initiating the at least one piston assembly on the fourth disk assembly; a first point mass travels within a cut pathway formed by the first disk assembly to a piston assembly at which the first point mass receives force from the piston assembly to move the first point mass through the first fixed plate and into a cut pathway formed by the second disk assembly wherein the first point mass travels within the cut pathway formed by the second disk assembly to a second piston assembly at which the first point mass receives force from the second piston assembly to move the first point mass back through the first fixed plate and into a cut pathway formed by the first disk assembly; and a second point mass travels within a cut pathway formed by the third disk assembly to a third piston assembly at which the second point mass receives force from the third piston assembly to move the second point mass through the second fixed plate and into a cut pathway formed by the fourth disk assembly wherein the second point mass travels within the cut pathway formed by the fourth disk assembly to a fourth piston assembly at which the second point mass receives force from the fourth piston assembly to move the second point mass back through the second fixed plate and into a cut pathway formed by the third disk assembly.

As will be apparent, the herein disclosed device for providing propulsion may be arranged in any number of alternative ways or embodiments, including by utilizing any number of disk modules, any number of piston assemblies, any number of stationary cam assemblies, and any number of point masses. All such combinations and permutations are intended to be included herein.

The one or more point masses comprising the various embodiments of the present invention may be any type of mass, or type of object having mass, that allows for free movement within a pre-cut pathway in response to rotational acceleration. For example, the point mass may be a ball bearing (or other rigid and spherical object) having a much smaller mass than the disk assemblies. In a preferred embodiment, one point mass is a ball bearing having a mass equal to 0.018% of the mass of a disk assembly (50.00 kg disk assembly mass versus 0.009 kg point mass, for example). But the one or more point masses may be formed of any material and may be in any phase of matter including phases of matter other than solid. For example, the one or more point masses may be a liquid material or may be a gas or gaseous (in other words, a vapor). In another example, a first point mass may be solid or in a solid phase, a second point mass may be liquid or in a liquid phase, and a third point mass may be a gas or in a gaseous phase.

The herein disclosed device for providing propulsion may be attached to any type of frame via the one or more stationary cam assemblies and/or the shaft. For example, the device for providing propulsion may be attached to a frame that is incorporated into an airplane, a helicopter, an autonomous aerial drone, a missile, a ground-based vehicle intended to travel horizontally along the ground, or any other object that requires propulsion.

CROSS-REFERENCES TO RELATED APPLICATIONS

None.

BACKGROUND OF THE INVENTION

The herein disclosed propulsion device is intended to be an improvement over well-known propulsion devices. Rocket-type engines are reaction engines that produce positive thrust by ejecting mass—created by a chemical reaction—in a direction opposite to the direction of intended propulsion. Jet-type engines are similar to rocket engines, but usually discharge a fast-moving jet of air created by a mechanical compressor. In either case, to create the high levels of thrust necessary to overcome gravity to propel an airplane into the air or a rocket into or beyond Earth's atmosphere, huge amounts of mass must be ejected in a direction opposite to the intended propulsion. This is not particularly efficient and, in the case of rocket launching into Earth's atmosphere or beyond into space, requires that huge amounts of fuel be carried within the rocket so that the necessary large-scale ejection of mass can be created.

It would therefore be advantageous to provide a propulsion device that is capable of producing sufficient propulsion to propel an object, such as an airplane or a spaceship, into the air or into space without the requirement that relatively large amounts of mass be ejected from the object. The present invention provides just such a novel and useful device that may be utilized to propel an object in an upward direction sufficiently to overcome gravity without necessitating the expulsion of waste mass or a fast-moving turbojet of air.

BRIEF DESCRIPTION OF THE SEVERAL VIEWS OF THE DRAWING

FIG. 7 illustrates a detailed view of a first disk assembly to illustrate various components that may comprise a piston assembly, in accordance with an exemplary embodiment of the present invention;

FIG. 8 illustrates a reverse view of a first disk assembly to illustrate one or more point masses and one or more cut pathways formed by the disk of the first disk assembly, in accordance with an exemplary embodiment of the present invention; and FIG. 9 illustrates a side view of a first disk assembly to illustrate a pushrod protruding through the disk to impart force on the point mass, in accordance with an exemplary embodiment of the present invention.

DETAILED DESCRIPTION OF THE INVENTION

Figure 1:
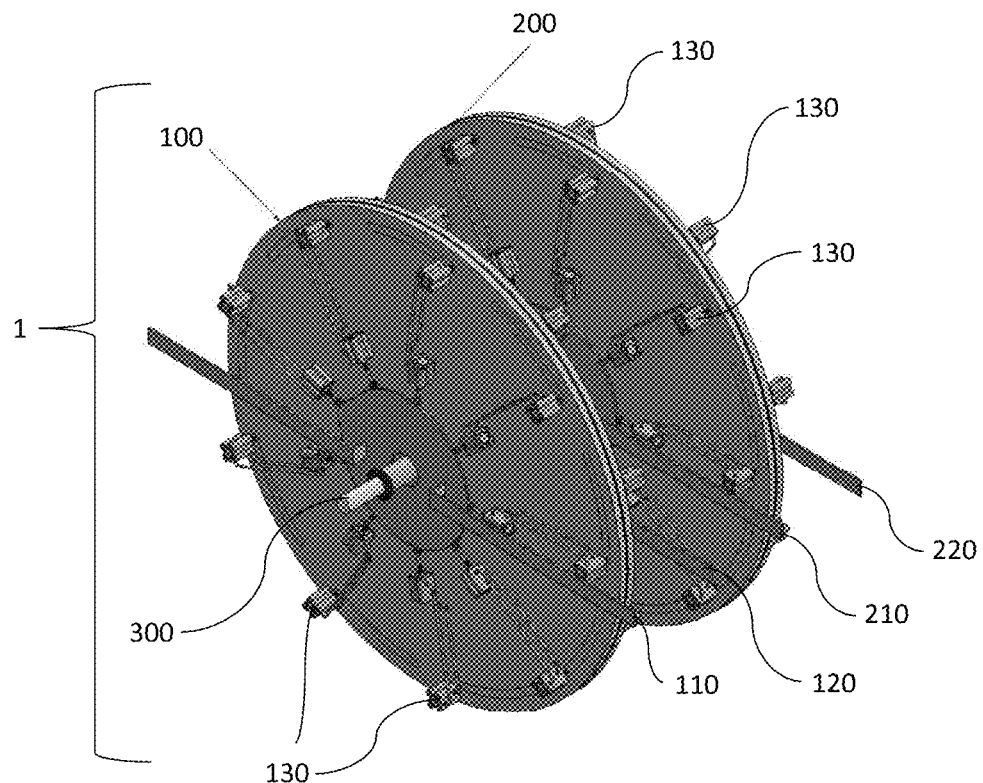
FIG. 1 illustrates a general overview of the herein disclosed device for providing propulsion, in accordance with an exemplary embodiment of the present invention.
Figure 2:
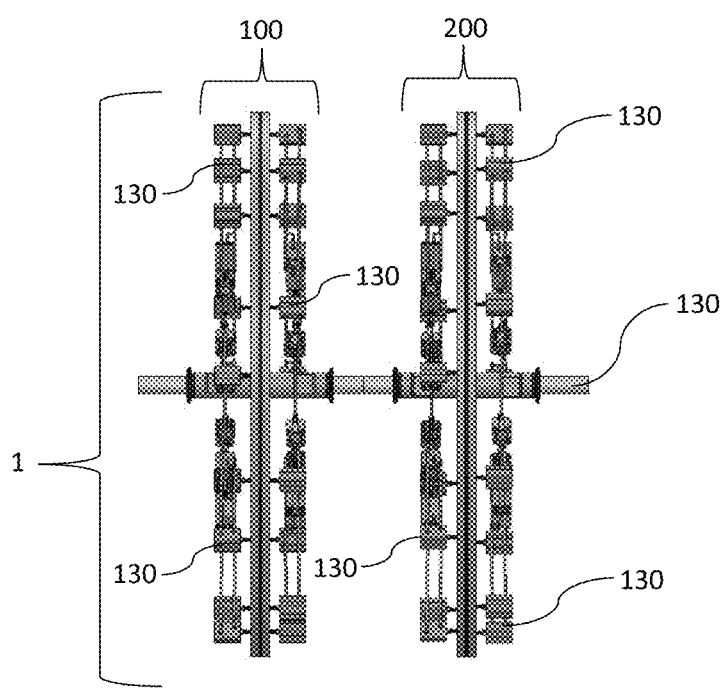
FIG. 2 illustrates a side view of the herein disclosed device for providing propulsion, in accordance with an exemplary embodiment of the present invention.

The present invention is device 1 for providing propulsion, and a preferred embodiment of device 1 utilizes a plurality of disk modules to provide increased propulsion and is shown in FIG. 1. Device 1 for providing propulsion includes first disk module 100 and second disk module 200, both of which are supported by shaft 300. The two disk modules (first disk module 100 and second disk module 200) are illustrated from a side view in FIG. 2 to show that they are aligned along shaft 300.

In the preferred embodiment as depicted in the drawing figures, each disk module includes a plurality of piston assemblies 130. In this preferred embodiment, first disk module 100 has 18 separate and identical piston assemblies 130, nine on each side of the disk module (the sides of the disk module are referred to as first disk assembly 101 and second disk assembly 102, which are separate disks placed along shaft 300 in an opposite orientation relative to each other; these disk assemblies are viewable in FIGS. 3-9). But while the drawing figures depict a preferred embodiment utilizing several of various components to maximize propulsion, the present invention may be embodied in a device that utilizes any number of disk modules including a single disk module in combination with a first stationary cam and a second stationary cam, and all such embodiments are intended to be included herein. And alternative embodiments may include any number of piston assemblies, including a single piston assembly on each side of disk module 100 for a total of two piston assemblies and one disk module.

Figure 3:
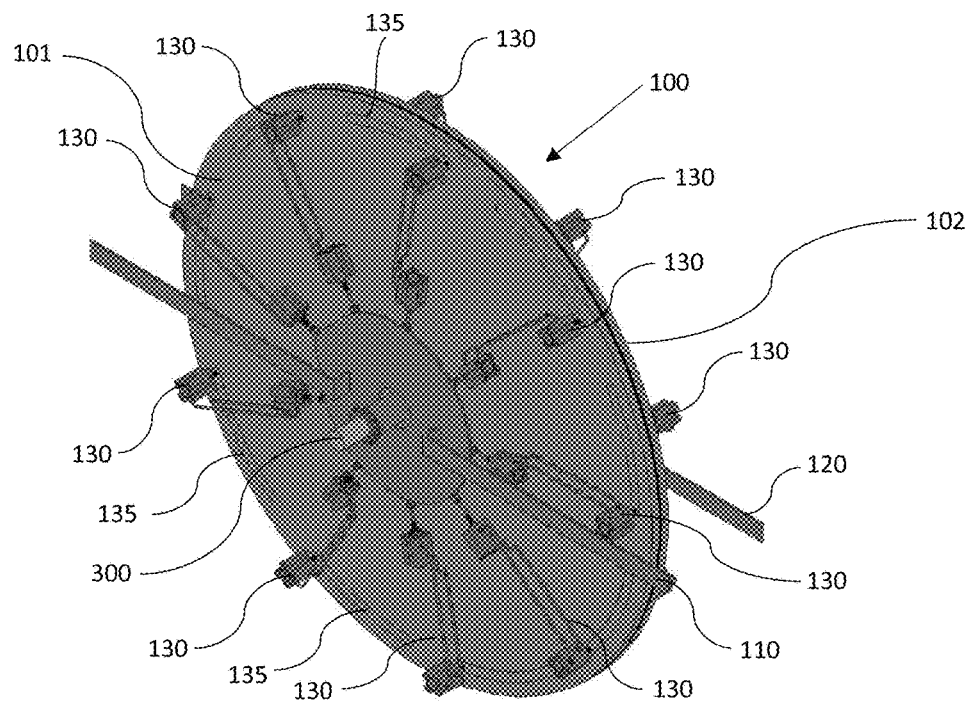
FIG. 3 illustrates an isometric view of a first disk module, a component of the herein disclosed device for providing propulsion, in accordance with an exemplary embodiment of the present invention; alternatively, the isometric view of a disk module as shown in FIG. 3 may encompass an alternative embodiment of the present invention having a single disk module.
Figure 4:
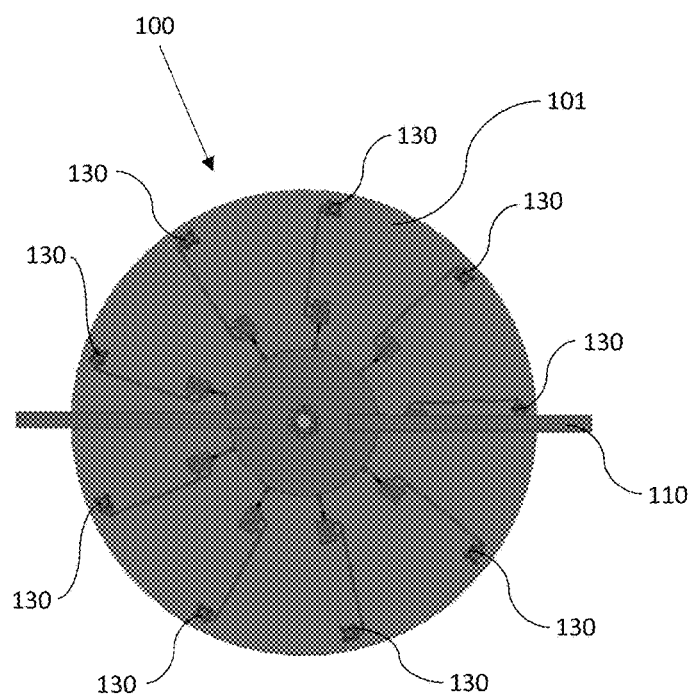
FIG. 4 illustrates a front view of a first disk module showing a plurality of piston assemblies, components of the herein disclosed device for providing propulsion, in accordance with an exemplary embodiment of the present invention; alternatively, the front view of a disk module as shown in FIG. 4 may encompass an alternative embodiment of the present invention having a single disk module.

Referring to FIG. 3, disk module 100 is shown having disk assembly 101 positioned opposite disk assembly 102. First stationary cam assembly 110 is positioned surrounding shaft 300 and is attached to the device frame (the device frame is unseen in the views) so that propulsion may be imparted to an object attached to the device frame. Second stationary cam assembly 120 is also positioned surrounding shaft 300 and is attached to the device frame at a different attachment point (which may be referred to as a second point or second attachment point). As can be seen in FIG. 3, a plurality of piston assemblies 130 are positioned around disk assembly 101 so that each piston assembly has a cam follower (component 131 in FIG. 7) positioned relatively closer to shaft 300 so that each cam follower 131 can receive physical indication from a cam (cam 111 of stationary cam assembly 110 in FIG. 6) that it is time to activate and protrude its pushrod 410 to physically push point mass 400 through fixed plate 103 and include cut pathways 135 of second disk assembly 102.

Figure 5:
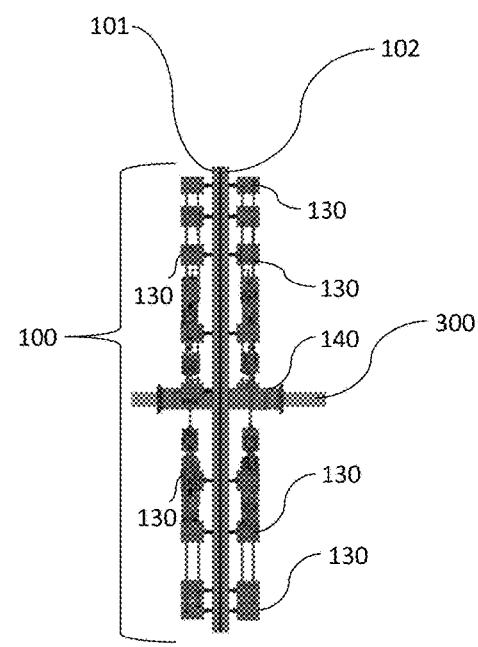
FIG. 5 illustrates a side view of a first disk module showing a first disk assembly having a plurality of piston assemblies and a second disk assembly having a plurality of piston assemblies, components of the herein disclosed device for providing propulsion, in accordance with an exemplary embodiment of the present invention; alternatively, the side view of a disk module as shown in FIG. 5 may encompass an alternative embodiment of the present invention having a single disk module.

As seen in FIG. 5, spacer 140 may facilitate positioning first disk module 100 relative to second disk module 200 along shaft 300.

Figure 6:
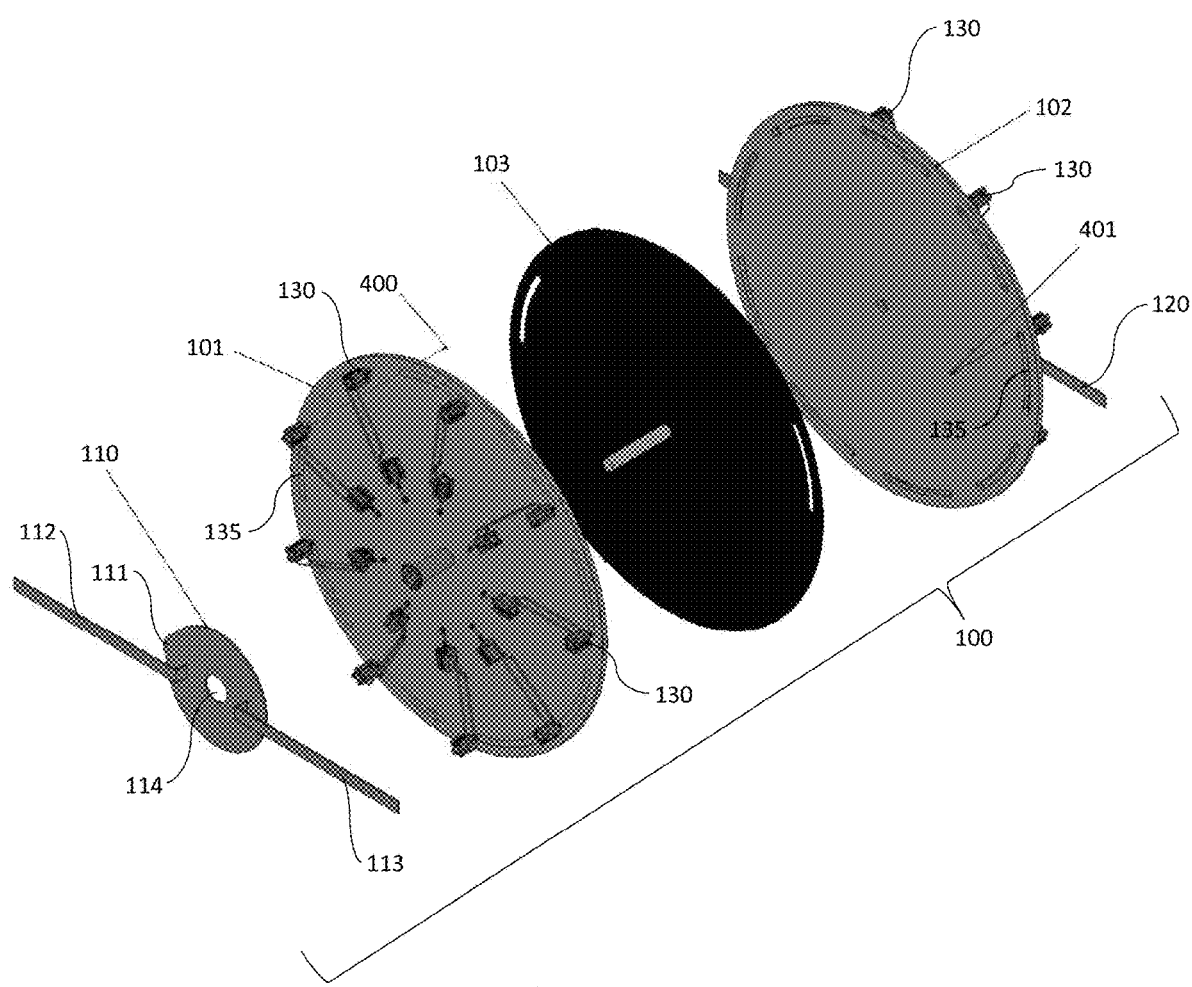
FIG. 6 illustrates an exploded view of a first disk module to illustrate the various components of the first disk module; alternatively, the exploded view of a disk module as shown in FIG. 6 may encompass an alternative embodiment of the present invention having a single disk module.

Referring to FIG. 6, a disk module is shown in an exploded view to illustrate the various components and how they are positioned relative to each other along shaft 300. Fixed plate 103 is fixed to shaft 300 so that it cannot rotate relative to shaft 300. Fixed plate 103 may include one or more slots for receiving one or more point masses 400 to allow the one or more point masses 400 to travel from first disk assembly 101 to second disk assembly 102. As is apparent in FIG. 6, each disk assembly (first disk assembly 101 and second disk assembly 102 positioned opposite to first disk assembly 101) has a first side having one or more piston assemblies 130 and a second side having one or more cut pathways 135 for directing rotational movement of the one or more point masses 400.

First stationary cam assembly 110 includes cam 111 for physically indicating to each piston assembly cam follower 131 that it is time to activate piston 132 to protrude pushrod 410. Cam 111 may be any type of cam or electronic indicator capable of communicating to cam follower 131. First stationary cam assembly 110 also includes first cam assembly arm 112 for attaching to a device frame at a first position and second cam assembly arm 113 for attaching to a device frame at a second position. This attachment to the frame facilitates transfer of propulsion from the device to the object intended to be propelled. First stationary cam assembly 110 forms cam aperture 114 for receiving shaft 300.

Different embodiments of the herein disclosed propulsion device may utilize different numbers of components, but a preferred embodiment as depicted in FIG. 1 includes first stationary cam assembly 110 for communicating with the one or more piston assemblies 130 of first disk assembly 101, second stationary cam assembly 120 for communicating with the one or more piston assemblies 130 of second disk assembly 102, third stationary cam assembly 210 for communicating with the one or more piston assemblies 130 of a third disk assembly (the first side of second disk module 200), and fourth stationary cam assembly 220 for communicating with the one or more piston assemblies 130 of a fourth disk assembly (the second side of second disk module 200).

Referring to FIG. 7, first disk assembly 101 is shown in detail to illustrate components of piston assemblies 130. Piston assemblies 130 each include cam follower 131 for receiving physical indication from cam 111 that it is time to activate, and piston 132 for protruding pushrod 410 through fixed plate 103 at this activation time. Piston 132 may be any type of piston capable of controllably protruding a pushrod to physically move point mass 400. In a preferred embodiment, piston 132 is a hydraulic piston with a spring return for returning to a recessed position after the protrusion has completed moving point mass 400.

Referring to FIG. 8, a plurality of cut pathways 135 may be formed on the second side of disk assembly 101 (on the opposite side of disk assembly 101 from the one or more piston assemblies 130). Embodiments of the present invention may include any number of cut pathways 135 positioned at any radius of disk assembly 101, including utilizing a single cut pathway 135 in certain embodiments.

Disk 150 may be any relatively heavy disk that is rigid enough to anchor one or more piston assemblies 130 and thick enough to form cut pathways 135 on a side opposite to the side anchoring one or more piston assemblies 130. In a preferred embodiment, disk 150 has a relatively large mass and point mass 400 has a relatively small mass. For example, a preferred embodiment utilizes a point mass having a mass equal to 0.018% of the mass of disk 150 (for example, a disk assembly may have a mass of 50.00 kg and a point mass may have a mass of 0.009 kg). As seen in FIG. 8, embodiments of the present invention may utilize a plurality of point masses 400, including, for example, first point mass 401, second point mass 402 and third point mass 403.

As can be seen in FIG. 9, spacer 140 may include or form sprocket 141 for receiving input force via a chain connection to a power source. Any type of power source may be utilized to input power to device 1 for providing propulsion and all types of power sources are intended to be included herein; for example, battery power may be utilized to rotate the various disk assemblies around shaft 300.

While certain embodiments of the present invention have been shown and described it is to be understood that the present invention is subject to many modifications and changes without departing from the spirit and scope of the invention presented herein. Furthermore, while the present invention has been illustrated and described herein in terms of a preferred embodiment and several alternatives, it is to be understood that the devices, apparatus, systems, and/or processes for propulsion described herein can have a multitude of additional uses and applications. Accordingly, the invention should not be limited to just the particular description and various drawing figures contained in this specification that merely illustrate a preferred embodiment and application of the principles of the invention. It should be noted that terms of orientation, such as horizontal and vertical and up and down, and direction such as top, bottom, front, rear, etc. as used herein are used to distinguish elements from one another within exemplary embodiments and should therefore not be taken as limiting the scope of the present invention to any specific orientation. Moreover, the use of the terms first, second, etc. do not denote any order or importance, but rather are used to distinguish one element from another. Furthermore, the use of terms a, an, etc. do not denote a limitation of quantity, but rather denote the presence of at least one of the referenced item. Therefore, the detailed description and accompanying drawings are not to be taken in a limiting sense, but rather to enable the present invention.

What is claimed is:

1. A device for providing propulsion comprising:
   a first disk module for rotating on a shaft, wherein the first disk module includes a rotating first disk assembly supported on a shaft and having at least one piston assembly, a first fixed plate, and a counter-rotating second disk assembly supported on the shaft and having at least one piston assembly, and wherein the first disk assembly is positioned opposite from the second disk assembly;

a second disk module for rotating on the shaft, wherein the second disk module includes a rotating third disk assembly supported on the shaft and having at least one piston assembly, a second fixed plate, and a counter-rotating fourth disk assembly supported on the shaft and having at least one piston assembly, and wherein the third disk assembly is positioned opposite from the fourth disk assembly;

a first stationary cam assembly rigidly attached to a device frame, wherein the first stationary cam assembly includes a first cam for physically initiating the at least one piston assembly on the first rotating disk assembly;

a second stationary cam assembly rigidly attached to the device frame, wherein the second stationary cam assembly includes a second cam for physically initiating the at least one piston assembly on the second counter-rotating disk assembly;

a third stationary cam assembly rigidly attached to the device frame, wherein the third stationary cam assembly includes a third cam for physically initiating the at least one piston assembly on the third rotating disk assembly;

a fourth stationary cam assembly rigidly attached to the device frame, wherein the fourth stationary cam assembly includes a fourth cam for physically initiating the at least one piston assembly on the fourth counter-rotating disk assembly;

a first point mass travels within a cut pathway formed by the first disk assembly to the piston assembly of the first rotating disk assembly at which the first point mass receives force from the piston assembly to move the first point mass through the first fixed plate and into a cut pathway formed by the second counter-rotating disk assembly wherein the first point mass travels within the cut pathway formed by the second disk assembly to the piston assembly of the second counter-rotating disk assembly at which the first point mass receives force from the second piston assembly to move the first point mass back through the first fixed plate and into a cut pathway formed by the first rotating disk assembly; and a second point mass travels within a cut pathway formed by the third rotating disk assembly to the piston assembly of the third rotating disk assembly at which the second point mass receives force from the piston assembly of the third rotating disk assembly to move the second point mass through the second fixed plate and into a cut pathway formed by the fourth counter-rotating disk assembly wherein the second point mass travels within the cut pathway formed by the fourth counter-rotating disk assembly to the piston assembly of the fourth counter-rotating disk assembly at which the second point mass receives force from the piston assembly of the fourth counter-rotating disk assembly to move the second point mass back through the second fixed plate and into a cut pathway formed by the third rotating disk assembly.

2. The device for providing propulsion as recited in claim 1, wherein:
the first rotating disk assembly has a plurality of piston assemblies, the second counter-rotating disk assembly has a plurality of piston assemblies, the third rotating disk assembly has a plurality of piston assemblies, and the fourth counter-rotating disk assembly has a plurality of piston assemblies; and the device for providing propulsion further includes a plurality of point masses traveling between the first rotating disk assembly and the second counter-rotating disk assembly and a plurality of point masses traveling between the third rotating disk assembly and the fourth counter-rotating disk assembly.

3. The device for providing propulsion as recited in claim 1, wherein each of the at least one piston assemblies includes a piston for controllably protruding a pushrod, and a cam follower for receiving physical indication that the piston should activate, wherein the piston is communicatively connected to the cam follower.

4. The device for providing propulsion as recited in claim 3, wherein the piston is a hydraulic piston having a spring return for returning the pushrod to a recessed position.

5. The device for providing propulsion as recited in claim 1, wherein the first stationary cam assembly further includes a first cam assembly arm for attaching to a first portion of the frame, a second cam assembly arm for attaching to a second portion of the frame, wherein the first cam assembly arm protrudes in a first direction from a cam assembly center portion forming the first cam and the second cam assembly arm protrudes in an opposite direction from the cam assembly center portion forming the first cam.

6. The device for providing propulsion as recited in claim 5, wherein:
the second stationary cam assembly further includes a third cam assembly arm for attaching to a third portion of the frame and a fourth cam assembly arm for attaching to a fourth portion of the frame, wherein the third cam assembly arm protrudes in a third direction from a cam assembly center portion forming the second cam and the fourth cam assembly arm protrudes in an opposite direction from the cam assembly center portion forming the second cam;

the third stationary cam assembly further includes a fifth cam assembly arm for attaching to a fifth portion of the frame and a sixth cam assembly arm for attaching to a sixth portion of the frame, wherein the fifth cam assembly arm protrudes in a fifth direction from a cam assembly center portion forming the third cam and the sixth cam assembly arm protrudes in an opposite direction from the cam assembly center portion forming the third cam; and the fourth stationary cam assembly further includes a seventh cam assembly arm for attaching to a seventh portion of the frame and an eighth cam assembly arm for attaching to an eighth portion of the frame, wherein the seventh cam assembly arm protrudes in a seventh direction from a cam assembly center portion forming the fourth cam and the eighth cam assembly arm protrudes in an opposite direction from the cam assembly center portion forming the fourth cam.

7. The device for providing propulsion as recited in claim 1, wherein the first point mass and the second point mass have a spherical shape and are formed of a rigid material.

8. The device for providing propulsion as recited in claim 1, wherein the first point mass is in a first phase of matter and the second point mass is in a second phase of matter.

9. The device for providing propulsion as recited in claim 1, wherein the first point mass and the second point mass are in a phase of matter other than solid.

10. The device for providing propulsion as recited in claim 1, wherein the first point mass and the second point mass each have a mass equal to approximately 0.018% of the first rotating disk assembly.

11. The device for providing propulsion as recited in claim 1, wherein the first point mass is equal to the second point mass, the first rotating disk assembly is equal to the second counter-rotating disk assembly and is positioned opposite to the second counter-rotating disk assembly so that both are supported by the shaft, the third rotating disk assembly is equal to the fourth counter-rotating disk assembly and is positioned opposite to the fourth counter-rotating disk assembly so that both are supported by the shaft, and the first disk module is equal to the second disk module and is positioned in line with second disk module so that both are supported by the shaft.

12. A device for providing propulsion comprising:
   a disk module for rotating on a shaft, wherein the disk module includes a first rotating disk assembly supported on the shaft and having at least one piston assembly, a first fixed plate, and a second counter-rotating disk assembly supported on the shaft and having at least one piston assembly, and wherein the first rotating disk assembly is positioned opposite from the second counter-rotating disk assembly;
   a first stationary cam assembly rigidly attached to a device frame, wherein the first stationary cam assembly includes a first cam for physically initiating the at least one piston assembly on the first rotating disk assembly;
   a second stationary cam assembly rigidly attached to the device frame, wherein the second stationary cam assembly includes a second cam for physically initiating the at least one piston assembly on the second counter-rotating disk assembly;
   a point mass travels within a cut pathway formed by the first rotating disk assembly to the piston assembly of the first rotating disk assembly at which the point mass receives force from the piston assembly to move the point mass through the fixed plate and into a cut pathway formed by the second counter-rotating disk assembly wherein the point mass travels within the cut pathways formed by the second counter-rotating disk assembly to the piston assembly of the second counter-rotating disk assembly at which the point mass receives force from the second piston assembly to move the point mass back through the first fixed plate and into the cut pathway formed by the first rotating disk assembly.

13. The device for providing propulsion as recited in claim 12, wherein:
   the first rotating disk assembly has a plurality of piston assemblies and the second counter-rotating disk assembly has a plurality of piston assemblies; and
   the device for providing propulsion further includes a plurality of point masses traveling between the first rotating disk assembly and the second counter-rotating disk assembly and a plurality of point masses.

14. The device for providing propulsion as recited in claim 12, wherein each of the at least one piston assemblies includes a piston for controllably protruding a pushrod, and a cam follower for receiving physical indication that the piston should activate, wherein the piston is communicatively connected to the cam follower.

15. The device for providing propulsion as recited in claim 14, wherein the piston is a hydraulic piston having a spring return for returning the pushrod to a recessed position.

16. The device for providing propulsion as recited in claim 12, wherein:
   the first stationary cam assembly further includes a first cam assembly arm for attaching to a first portion of the frame, a second cam assembly arm for attaching to a second portion of the frame, wherein the first cam assembly arm protrudes in a first direction from a cam assembly center portion forming the first cam and the second cam assembly arm protrudes in an opposite direction from the cam assembly center portion forming the first cam; and
   the second stationary cam assembly further includes a third cam assembly arm for attaching to a third portion of the frame and a fourth cam assembly arm for attaching to a fourth portion of the frame, wherein the third cam assembly arm protrudes in a third direction from a cam assembly center portion forming the second cam and the fourth cam assembly arm protrudes in an opposite direction from the cam assembly center portion forming the second cam.

17. The device for providing propulsion as recited in claim 12, wherein the point mass has a spherical shape and is formed of a rigid material.

18. The device for providing propulsion as recited in claim 12, wherein the point mass has a mass equal to approximately 0.0018% of the first rotating disk assembly.

19. The device for providing propulsion as recited in claim 12, wherein the first rotating disk assembly is equal to the second counter-rotating disk assembly and is positioned opposite to the second counter-rotating disk assembly so that both are supported by the shaft.

* * * * *